United States Patent [19]

Tokura et al.

[11] Patent Number: 4,906,418

[45] Date of Patent: Mar. 6, 1990

[54] METHOD FOR TEACHING A MACHINING LINE

[75] Inventors: Yasufumi Tokura, Toyota; Shigeo Hotta, Nogoya; Osamu Matsuda, Kariya; Hajime Fukami, Nagoya, all of Japan

[73] Assignee: Toyoda-Koki Kabushiki-Kaisha, Kariya, Japan

[21] Appl. No.: 261,391

[22] Filed: Oct. 24, 1988

[30] Foreign Application Priority Data

Oct. 23, 1987 [JP] Japan .................. 62-269063
Nov. 7, 1987 [JP] Japan .................. 62-281845

[51] Int. Cl.$^4$ ............................................ G05B 19/42
[52] U.S. Cl. ............................... 364/191; 364/474.31; 364/513; 901/3; 901/47
[58] Field of Search ............. 364/167.01, 191–193, 364/474.03, 474.31, 474.37, 513; 901/10, 3, 47; 250/202; 318/577

[56] References Cited

U.S. PATENT DOCUMENTS

| | | | |
|---|---|---|---|
| 4,550,383 | 10/1985 | Sugitmoto | 364/191 |
| 4,590,356 | 5/1986 | Porlick et al. | 901/47 |
| 4,590,577 | 5/1986 | Nio et al. | 901/3 |
| 4,648,024 | 3/1987 | Kato et al. | 364/474.31 |
| 4,672,190 | 6/1987 | Rostkowski et al. | 250/202 |
| 4,675,502 | 6/1987 | Haefner et al. | 901/47 |

FOREIGN PATENT DOCUMENTS

| | | |
|---|---|---|
| 59-154308 | 9/1984 | Japan . |
| 61-86088 | 5/1985 | Japan . |
| 60-107106 | 6/1985 | Japan . |
| 61-108485 | 5/1986 | Japan . |

*Primary Examiner*—John R. Lastova
*Attorney, Agent, or Firm*—Oblon, Spivak, McClelland, Maier & Neustadt

[57] ABSTRACT

A method for teaching a machining line to be machined is disclosed. A borderline is formed along the machining line on a workpiece. Then, a borderline sensor is moved across the borderline at each sensing position. The positions of the sensor are stored as a teaching position at each time when the borderline is detected by the sensor. The sensing interval between each teaching position is automatically adjusted according to the change in the curvature of the borderline. At the place where the curvature of the borderline becomes large, the sensing interval is shortened in order to maintain teaching accuracy.

9 Claims, 17 Drawing Sheets

METHOD FOR TEACHING A MACHINING LINE

BACKGROUND OF THE INVENTION

1. Field of the Invention:

The present invention relates to a method capable of automatic teaching of a machining line, which is used in a machining apparatus.

2. Description of the Prior Art:

In some machining apparatus, a borderline sensor is used for teaching a machining line automatically. In such machining apparatus, an operation program for controlling the teaching operation of the machining apparatus is prepared for each different machining operation. The operation programs are made in such a way that the borderline sensor is moved along the machining line and moves across the machining line at a predetermined interval. Then, the position of the borderline sensor is stored in a memory as a teaching position every time the machining line is detected by the sensor.

In the operation program described above, the sensing direction of the sensor, which defines paths across the machining line, should be programmed for each sensing position and the number of sensing positions becomes large, because the machining operation of the machining apparatus is performed in a three-dimensional space as well as in a two-dimensional surface. Accordingly, the operation program becomes very complex, and large amounts of labor and time are needed to prepare such operation program. Furthermore, the operation program should be prepared for each different machining operation, because the operation program can not commonly be used for various machining operations.

SUMMARY OF THE INVENTION

Accordingly, it is a primary object of the present invention to provide an improved method for teaching a machining line capable of eliminating the necessity of preparing the operation program.

Another object of the present invention is to provide an improved method capable of automatically adjusting the sensing interval between each teaching position according to the curvature of the machining line in order to improve teaching accuracy.

Briefly, according to the present invention, there is provided a method of teaching a machining line to be machined. At first a borderline along the machining line is formed on a workpiece. A borderline sensor for detecting the borderline is located at a teaching position on the borderline. Then the sensor is moved from the teaching position to a sensing start position, which is away from the teaching position and located on one side of said borderline, and is moved along a line across the borderline in order to detect the position of the borderline. The position of the borderline is memorized into memory means as a next teaching position. The above mentioned steps are automatically repeated so that the shape of the machining line is automatically detected. Accordingly, it is possible to accomplish teaching operation without the operation program which should be modified according to the shapes of machining lines.

According to another aspect of the invention, the sensing interval between each teaching position is automatically adjusted according to the curvature of the borderline. The curvature is calculated based on the positions of three teaching positions previously detected. Accordingly, the sensing interval is shortened where the curvature of the borderline becomes large so that the teaching accuracy is maintained regardless of the change in the curvature of the borderline.

According to the present invention, there is also provided a method for sensing the borderline formed on a workpiece. In this method, a first sensing interval is determined based upon the curvature of the borderline at the portion located before the previous sensing position. The borderline sensor is moved away from the previous sensing position to a next sensing start position by movement of the first sensing interval, and is moved across the borderline to detect the position of the borderline as a next sensing position. After that a second sensing interval is determined based upon the curvature of the borderline at the portion located before the next sensing position, and the first and second sensing intervals are compared each other. When the first sensing interval is smaller than the second interval, the next sensing position is memorized. On the other hand, when the second sensing interval is smaller than the first interval, the sensor is moved back to the previous sensing position, and then the above-noted sensing operation is repeated using the second sensing interval.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which.

DESCRIPTION OF THE PREFERRED EMBODIMENTS

Figure 1:
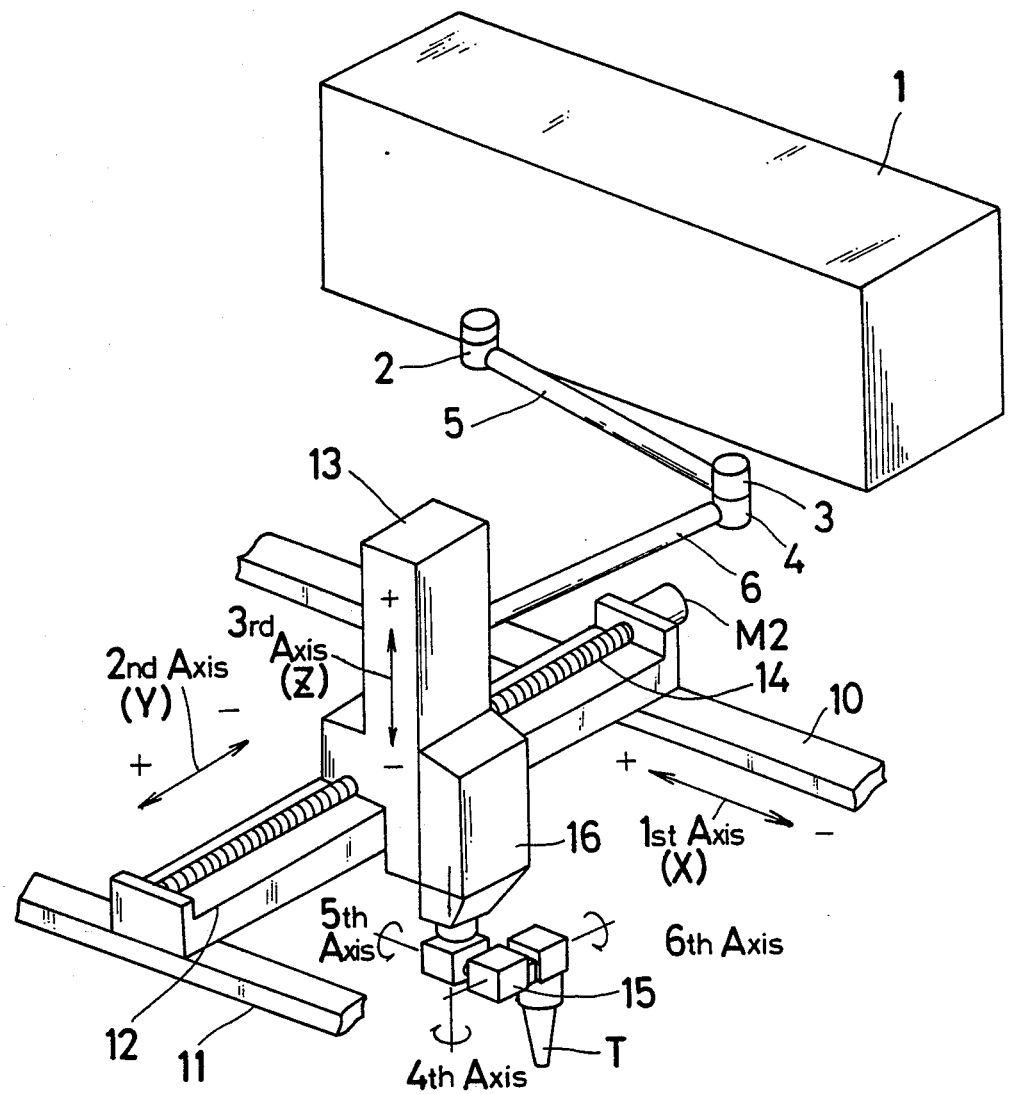
FIG. 1 is a schematic view of a laser machining apparatus according to the present invention.

Referring now to the drawings, FIG. 1 illustrates a laser machining apparatus constructed in accordance with a first embodiment of the present invention.

A first rail member 12 is guided by rails 10, 11 and is moved along the first axis (i.e., X axis) by a servomotor. A carrier 13 is mounted on the rail member 12 and is moved along the second axis (i.e., Y axis) by a feed screw 14 driven by a servomotor M2. On one side of the carrier 13, a moving head 16 is mounted and is moved along the third axis (i.e., Z axis). A wrist 15 which swings about the fourth, fifth and sixth axes is mounted at the lower end of the moving head 16. On the wrist 15, a machining tool T such as a laser torch for a emitting laser beam and a borderline sensor S are mounted. Numeral 1 indicates a laser exciting apparatus, and a laser beam emitted by the laser exciting apparatus 1 is led to the carrier 13 with mirrors 2, 3, 4 and beam guides 5, 6 so that the laser beam is emitted from the machining tool T against a workpiece W.

Figure 2:
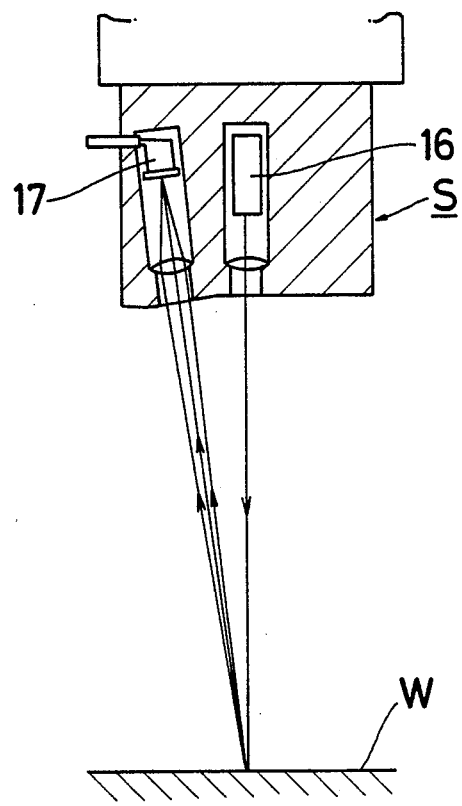
FIG. 2 is a sectional chart of the borderline sensor shown in FIG. 1.
Figure 3A:
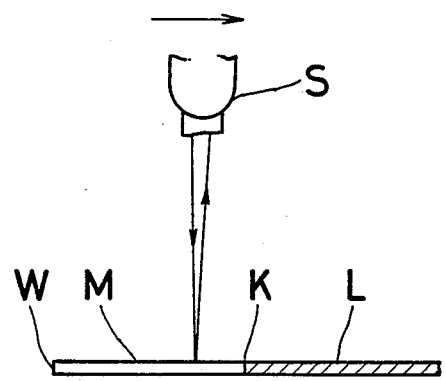
FIG. 3(a) and 3(b) are explanatory charts explaining the operation for detecting a borderline.
Figure 3B:
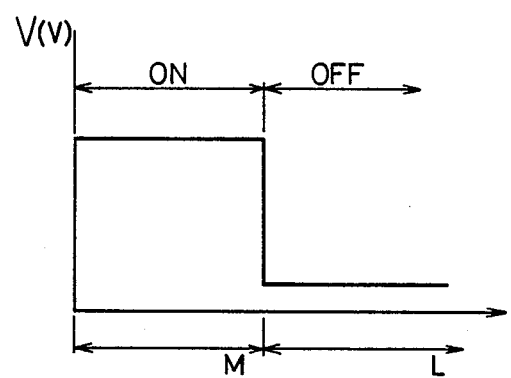

FIG. 2 shows the structure of the borderline sensor S. A light emitting device 16 for emitting a light beam against the workpiece W and a light receiving device 17 for detecting a light beam reflected from the workpiece W are mounted on the sensor S. The borderline sensor S outputs an on-off signal based upon the amount of reflected light beam which is received by the light receiving device 17 in order to detect a borderline K on the workpiece W. Namely, the working surface of the workpiece W is divided into two zones by the borderline K corresponding to a machining line, and one of the two zones is colored with black paint, as shown in FIG. 3(a), so that one zone becomes a dark zone L and another zone becomes a bright zone M. The light receiving device 17 detects the borderline K based upon the change in the reflected light beam between the dark zone L and the bright zone M, and changes the status of the output signal as shown in FIG. 3(b).

Figure 3C:
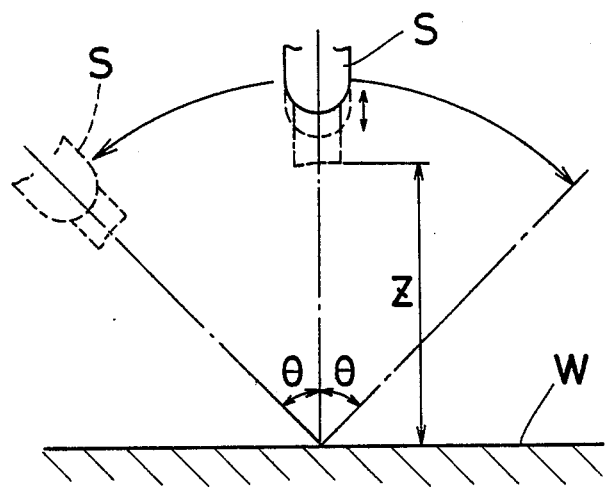
FIG. 3(c) and 3(d) are explanatory charts explaining the operation for detecting the squareness of a surface by swinging movement.

Furthermore, it is possible to obtain the squareness of the machining surface of the workpiece by the swing operation of the borderline sensor S. The borderline sensor S is swung within a swing angle $\theta$ by a composite movement in the six axes as shown in FIG. 3(c), and the angle position where the amount of light reflected from the workpiece W reaches the maximum value is detected so as to calculate the squareness. The height Z of the borderline sensor S from the workpiece W can be also detected by an autofocus mechanism (not shown). The above described detecting operations are commanded by control signals from a sensor controller SC. Other kinds of sensors, which can discriminate the above mentioned two zones, can be used as a borderline sensor.

Figure 4:
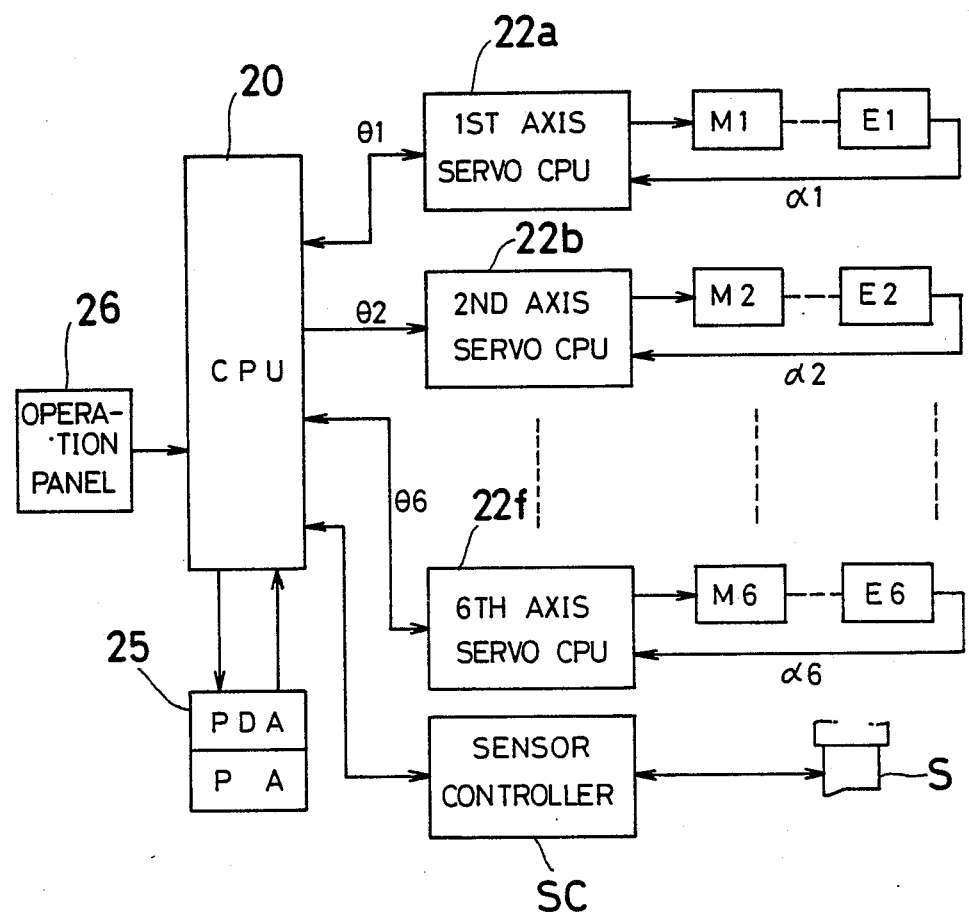
FIG. 4 is a block diagram showing the electrical controller of the laser machining apparatus shown in FIG. 1.

FIG. 4 is a block diagram illustrating the structure of the electrical controller for the laser machining apparatus. In FIG. 4, numeral 20 indicates a central processing unit (hereinafter referred to as a "CPU") which consists of a microcomputer. A memory 25, servo CPUs $22a \sim 22f$ for driving servomotors $M1 \sim M6$, and an operation panel 26 for commanding a jog operation and for teaching the teaching positions are connected to the CPU 20. The servomotors $M1 \sim M6$ drive the first axis through the sixth axis of the laser machining apparatus, respectively.

The servo CPUs $22a \sim 22f$ calculate differences between target rotational angles calculated by a secondary interpolation of commanded rotational angles $\theta 1 \sim \theta 6$ and the present angles $\alpha 1 \sim \alpha 6$ output from encoders $E1 \sim E6$ connected to the servomotors $M1 \sim M6$ in order to rotate the servomotors $M1 \sim M6$ at the speeds according to the calculated differences, respectively.

In the memory 25, there is provided a memory area PDA for storing data indicating positions whereat the machining tool T is moved and attitudes of the machining tool T at each positions, and the normal speed of movement. The position data, attitude data and speed data for a series of target positions are stored during the teaching mode. There is also provided a memory area PA in the memory 25 for storing a program which defines the operation of the controller. The borderline sensor S is connected to the CPU 20 via the sensor controller SC.

Figure 5:
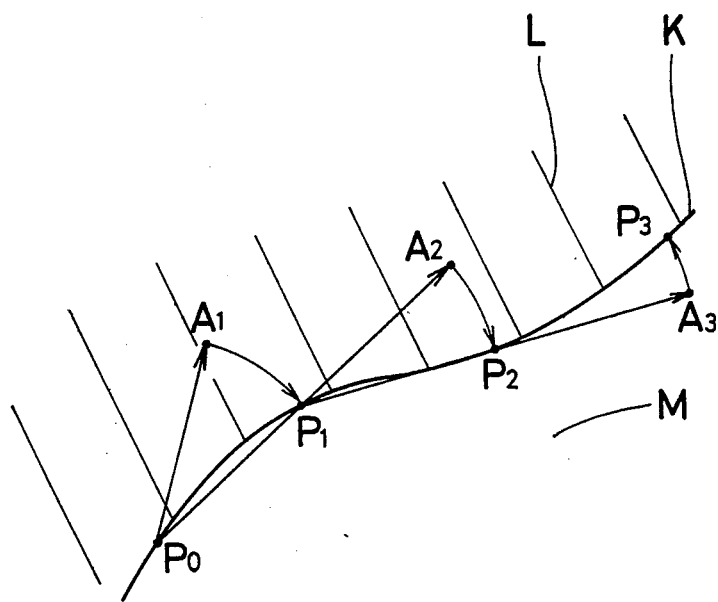
FIG. 5 is an explanatory chart explaining basic sensing operation.

The basic process of the CPU 20 for detecting a borderline K will be explained with an explanatory chart shown in FIG. 5 and flow charts shown in FIG. 6 through FIG. 8.

Figure 6:
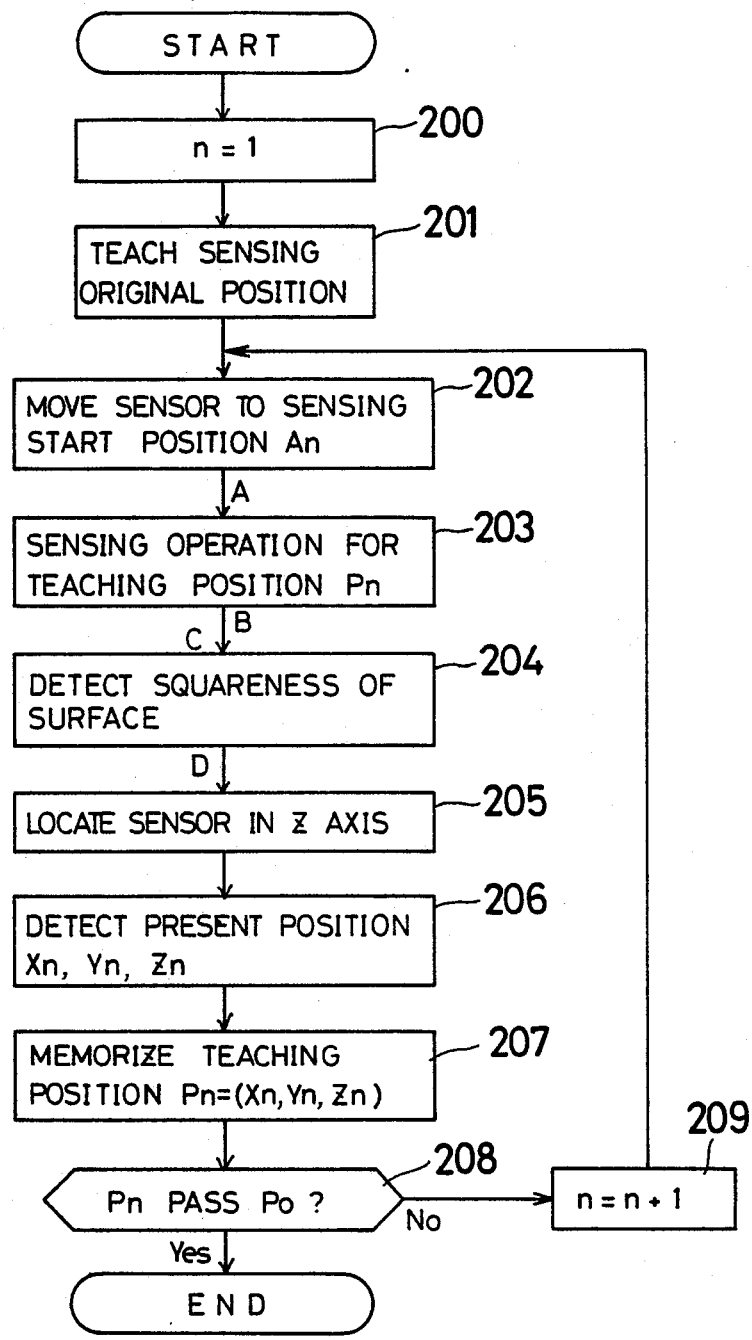
FIG. 6 is a flow chart explaining the operation of the CPU shown in FIG. 4.

At step 200 of the flow charts shown in FIG. 6, a variable n for designating the teaching position is initially set to 1. At step 201, the borderline sensor (hereinafter referred to as a sensor) S is moved to a sensing original position Po located on the borderline K by a manual teaching operation. Thereafter, the sensor S is moved to a sensing start position An in step 202. In this case, the sensor S is moved to a first sensing start position A1, as shown in FIG. 5, because the variable n is set to 1. At step 203, a sensing operation for detecting a teaching position Pn is accomplished. The sensing operation will be explained in detail hereinbelow.

Thereafter, the squareness of the machining surface is detected at step 204. The detailed process of step 204 is shown in FIG. 7. At step 205, the height Zn of the sensor S from the workpiece W is measured and the sensor S is moved to a position which is spaced from the workpiece W by a predetermined distance. Thereafter, the present position data Xn, Yn, Zn are read from the present position register (not shown) at step 206, and the position data Xn, Yn, Zn are stored in the memory 25 as position data of the teaching position Pn, at step 207. At step 208, it is ascertained whether or not the teaching position Pn passes the sensing original position Po. Namely, since the machining line has a closed loop shape in this embodiment, it can be ascertained whether or not the sensing operation is accomplished throughout the machining line by ascertaining whether or not the teaching position Pn passes the sensing original position Po. If the teaching position Pn does not pass the sensing original position, the variable n designating the teaching position is incremented by 1, and then the process moves back to step 202 so as to move the sensor S to a sensing start position An+1 which is located in the designated direction. The designated direction coincides with the direction of a straight line which connects teaching position Pn−1 and Pn. While the sensing interval is determined by a process which will be described later, the initial sensing interval is set to minimum value dmin.

Thereafter, the steps 202~209 are sequentially repeated until teaching position Pn reaches the original position Po. Hereafter, the above described process is referred to as a "basic sensing operation of the sensor S".

Figure 7:
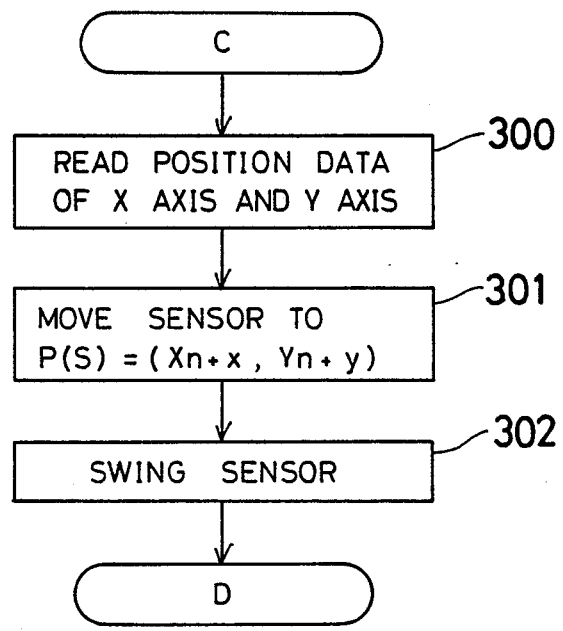
FIG. 7 is a detailed flow chart explaining the squareness detecting operation shown in FIG. 6.
Figure 8:
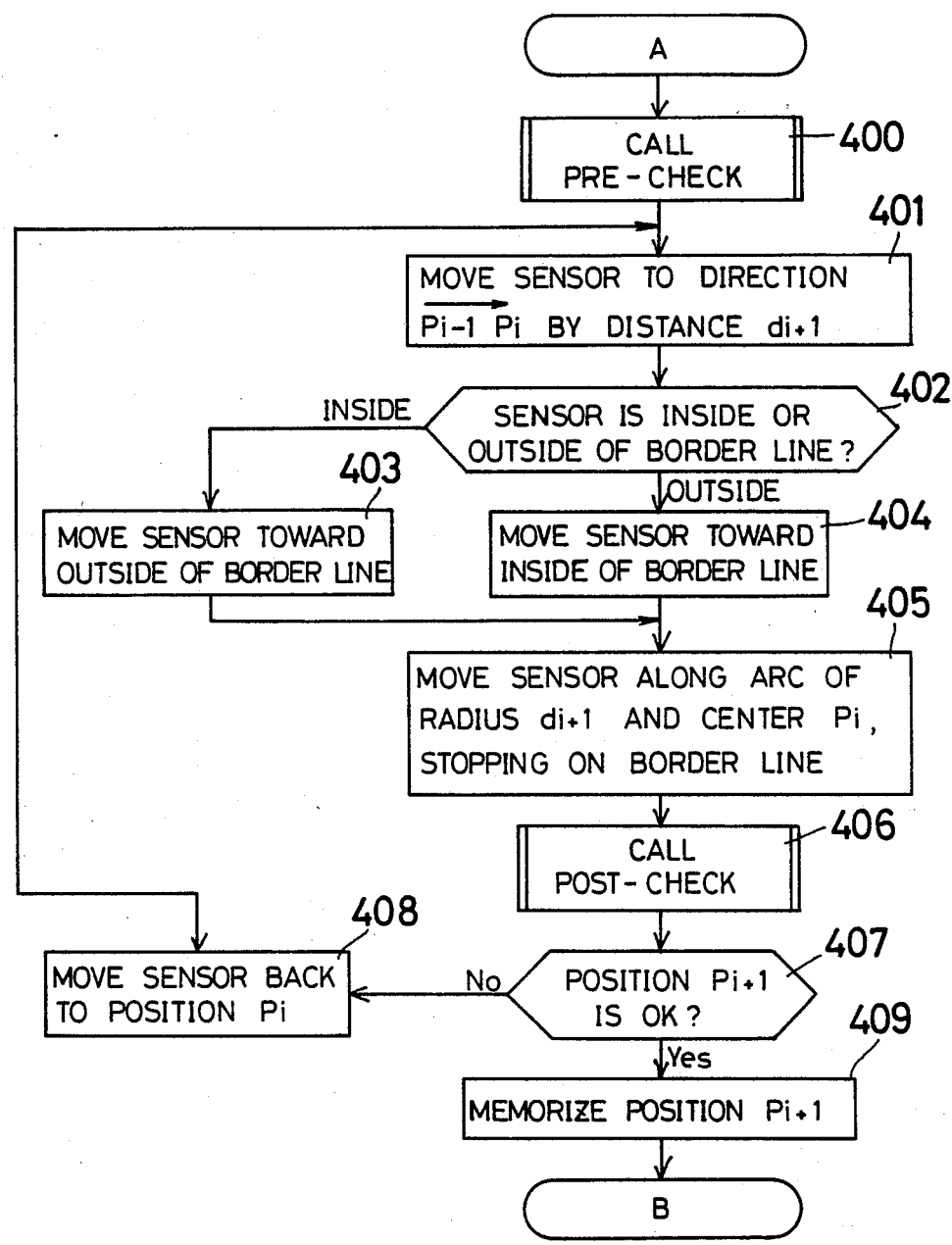
FIG. 8 is a detailed flow chart explaining the sensing operation shown in FIG. 6.

FIG. 7 is a flow chart illustrating the operation of the CPU 20 for detecting the squareness of the surface.

Figure 3D:
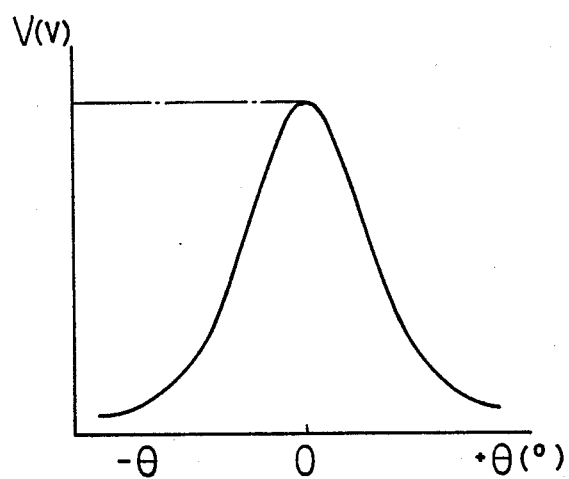

Namely, the X axis position data and Y axis position data of the sensor S are read out at step 300, and the sensor S is moved to a position P(s) at step 301. The position P(s) is offset from the teaching position Pn (Xn, Yn, Zn) by a predetermined distance x and y, respectively, along the X axis and Y axis. Thereafter, the sensor S is swung within the swing angle $\theta$ as shown in FIGS. 3(c) and 3(d) in order to detect the squareness of the surface.

The sensor S can be moved in a different way at step 301. The sensor S is swung from the teaching position Pn (Xn, Yn) into the bright zone by a predetermined distance (ex. 1 mm) by a rotational motion about the fourth axis.

Figure 9:
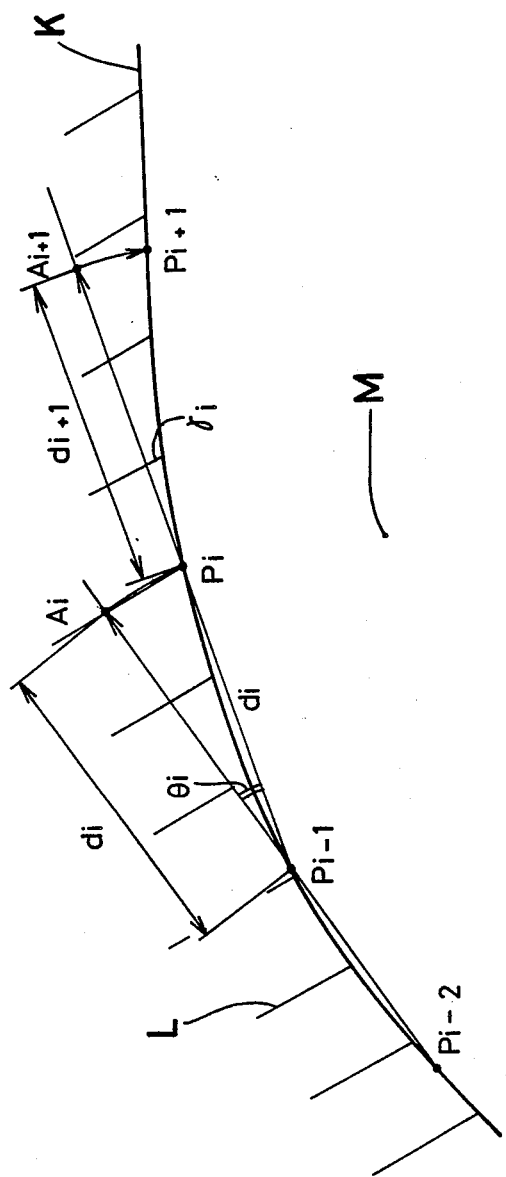
FIG. 9 is an explanatory chart explaining the theory of determining the sensing interval.

The borderline sensing operation of the borderline sensor S will be described hereafter with reference to a flow chart shown in FIG. 8 and an explanatory chart shown in FIG. 9.

At first, a subroutine for a pre-check is called at step 400. The subroutine will be described in detail hereinafter. At step 401, the sensor S is moved by a distance $di+1$ from the teaching position Pi along a direction parallel to the line $\overline{Pi-1\ Pi}$ so that the sensor S is moved to a sensing start position $Ai+1$. The distance is determined at step 400 as subsequently described. Thereafter, it is ascertained at step 402 whether the sensing start position $Ai+1$ is located inside the borderline or outside the borderline. In this embodiment, the inside zone is referred to as a dark zone L, and the outside zone is referred to as a bright zone M. If the sensor S is located at the inside zone, the sensing direction is set outward at step 403. If the sensor S is located at the outside zone, the sensing direction is set inward at step 404. By the above mentioned process, the sensing direction of the sensor S is determined in such a way that the sensor S can be moved across the borderline K. Thereafter, the sensor S is moved from the sensing starting position $Ai+1$ to the direction determined at step 403 or 404 along an arc of radius $di+1$, the center of which is located at the teaching position Pi. Then, the sensor S is stopped at a place where the sensor S detects the borderline K.

Subsequent to this step, a subroutine for a post-check is called at step 406. This subroutine will be subsequently described in detail. Afterwards, it is ascertained at step 407 whether or not the new position $Pi+1$ can be used as a teaching position, according to the result of the post-check at step 406. If the position $Pi+1$ can not be used as a teaching position, the sensor S is moved back to the teaching position Pi at step 408, and the process moves back to step 401 in order to execute the sensing operation again. When the position $Pi+1$ can be used, the position $Pi+1$ is stored as a new teaching position at step 409.

Figure 10:
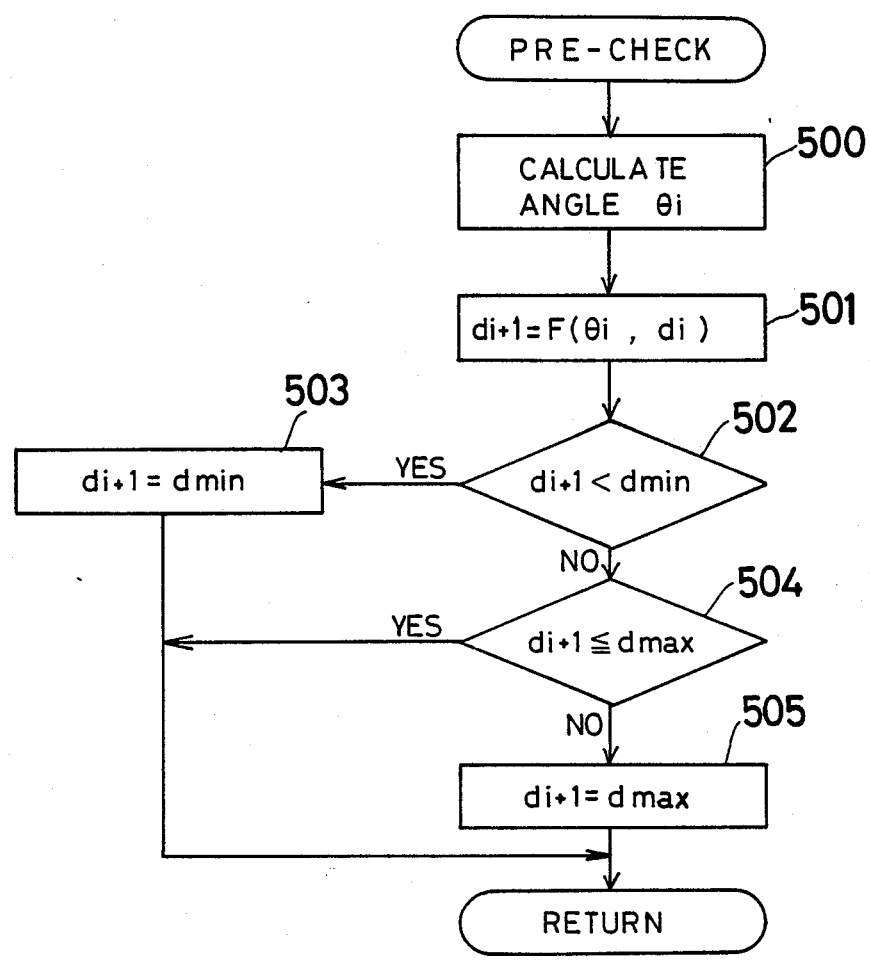
FIG. 10 is a flow chart explaining the operation of the pre-check subroutine shown in FIG. 8.

FIG. 10 is a flow chart illustrating the detailed process of the pre-check subroutine. This subroutine is used for determining the sensing interval of the sensing operation.

At step 500, an angle $\theta i$ between a line $\overline{Pi-2\ Pi-1}$ connecting the teaching positions $Pi-2$ and $Pi-1$, and a line $\overline{Pi-1\ Pi}$ connecting the teaching positions $Pi-1$ and Pi is calculated. The angle $\theta i$ indicates the angle of the arc between the sensing start position Ai and the teaching position Pi whereat the sensor S detected the borderline K. At step 501, a sensing interval $di+1$ is calculated as the function $F(\theta i, di)$ of the angle $\theta i$ and the sensing interval di used in the previous sensing operation. At step 502, the calculated sensing interval $di+1$ is compared with a predetermined lower limit dmin of the sensing interval. If $di+1<dmin$, the sensing interval $di+1$ is set to the lower limit dmin at step 503. If $di+1$ dmin is not met, the sensing interval $di+1$ is compared with a predetermined upper limit dmax. Then, if $di+1 \geqq dmax$, the sensing interval $di+1$ is used, and if $di+1>dmax$, the sensing interval $di+1$ is set to the upper limit dmax at step 505. Namely, the sensing interval $di+1$ can vary only between the lower limit dmin and the upper limit dmax.

The function $F(\theta i, di)$ used for calculating the sensing interval $di+1$ is described below.

$$F(\theta i, di) = \left\{ a\left(\frac{b}{1-\cos\theta i} - 1\right) + 1 \right\} di$$

where a and b are constant values, and the constant value a is used when $$\frac{b}{1-\cos\theta i} - 1 > 0$$

and 1/a is used as the constant value a when $$\frac{b}{1-\cos\theta i} - 1 < 0$$

Figure 11:
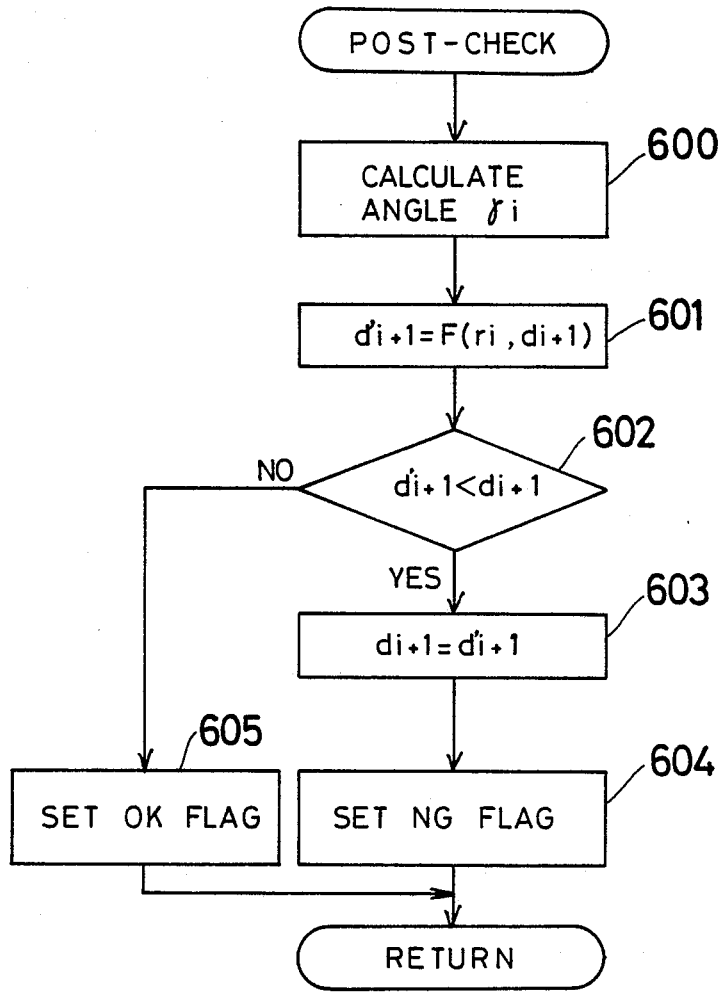
FIG. 11 is a flow chart explaining the operation of the post-check subroutine shown in FIG. 8.

FIG. 11 is a flow chart illustrating the detailed process of the post-check subroutine. This subroutine serves to determine whether or not detected position $Pi+1$ can be used as a teaching position, and for compensating the sensing interval $di+1$ used in the next sensing operation when the detected position $Pi+1$ can not be used. The process in the post-check subroutine will be described below with reference to FIG. 11 and FIG. 12.

Figure 12:
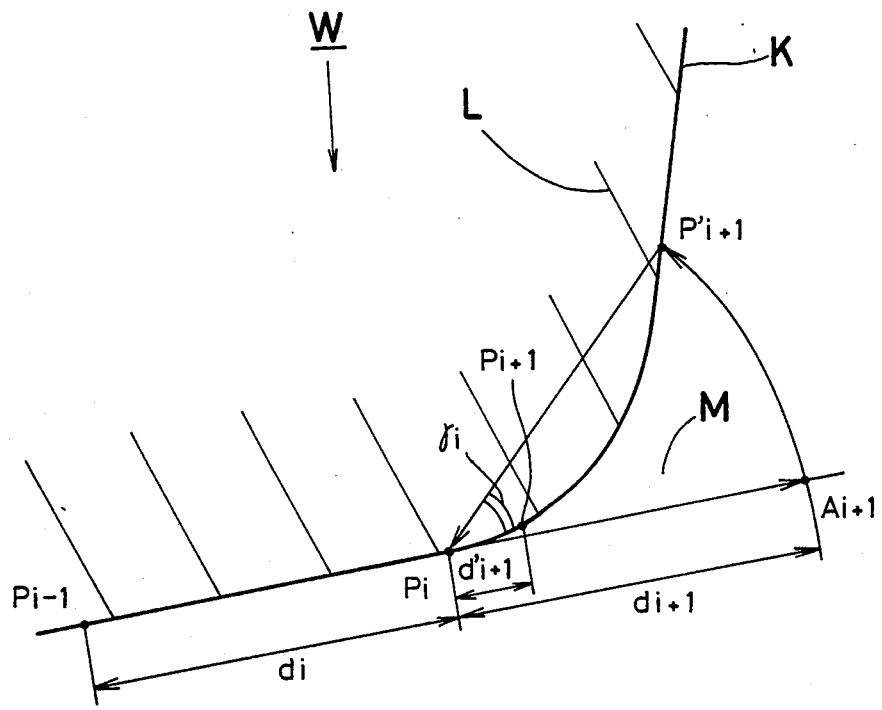
FIG. 12 is an explanatory chart showing the process of ascertaining whether or not the detected teaching position can be used.

At step 600, an angle $\gamma i$ between a line $\overline{Pi-1\ Pi}$ connecting the positions $Pi-1$ and Pi and a line $\overline{Pi\ Pi+1}$ connecting the positions Pi and $Pi+1$. The position $Pi'+1$ is the position on the borderline K, which is detected by the sensing operation with the sensing interval $di+1$ as shown in FIG. 12. Afterward, a new sensing interval $d'i+1$ is calculated as the function F ($\gamma i$, $di+1$) al step 601. At step 602, the sensing intervals $d'i+1$ and $di+1$ are compared with each other.

Then, if $d'i+1<di+1$, the sensing interval $di+1$ is set to $d'i+1$ at step 603, and an NG flag for indicating that the position $Pi+1$ can not be used as a teaching position is set at step 604. After that, the process returns to the main routine shown in FIG. 8. On the other hand, if $d'i+1<di+1$ is not met, an OK flag for indicating that the position $Pi+1$ can be used as a teaching position is set at step 605, and the process returns to the main routine.

When the OK flag is set at the step 605, it is judged at step 407 in the main routine that the position $Pi+1'$ can be used, and the position $P'i+1$ is stored as the next teaching position $Pi+1$ at step 409.

On the other hand, when the NG flag is set at step 604, it is judged at step 407 in the main routine that the position $P'i+1$ can not be used, and the process moves to the step 408 so that the sensor S is moved back to the teaching position Pi. After that the process moves back to step 401 in order to execute the basic sensing operation with sensing interval d'i+1. Then, a newly detected position is stored as a next teaching position if it is ascertained by the post-check subroutine that d'i+1<di+1 is not met. However, if it is ascertained that d'i+1<di+1 is met, the above described sensing operation is repeated until it is ascertained that d'i+1<di+1 is not met. Accordingly, the sensing interval is automatically shortened according to the curvature of the borderline K.

By using the above described sensing operation capable of automatically shortening the sensing interval, it is possible to track the complicated borderline having many curves whereat the curvature become large. Accordingly, it becomes possible to maintain the machining accuracy, even if the machining line to be machined has many curves.

Figure 13:
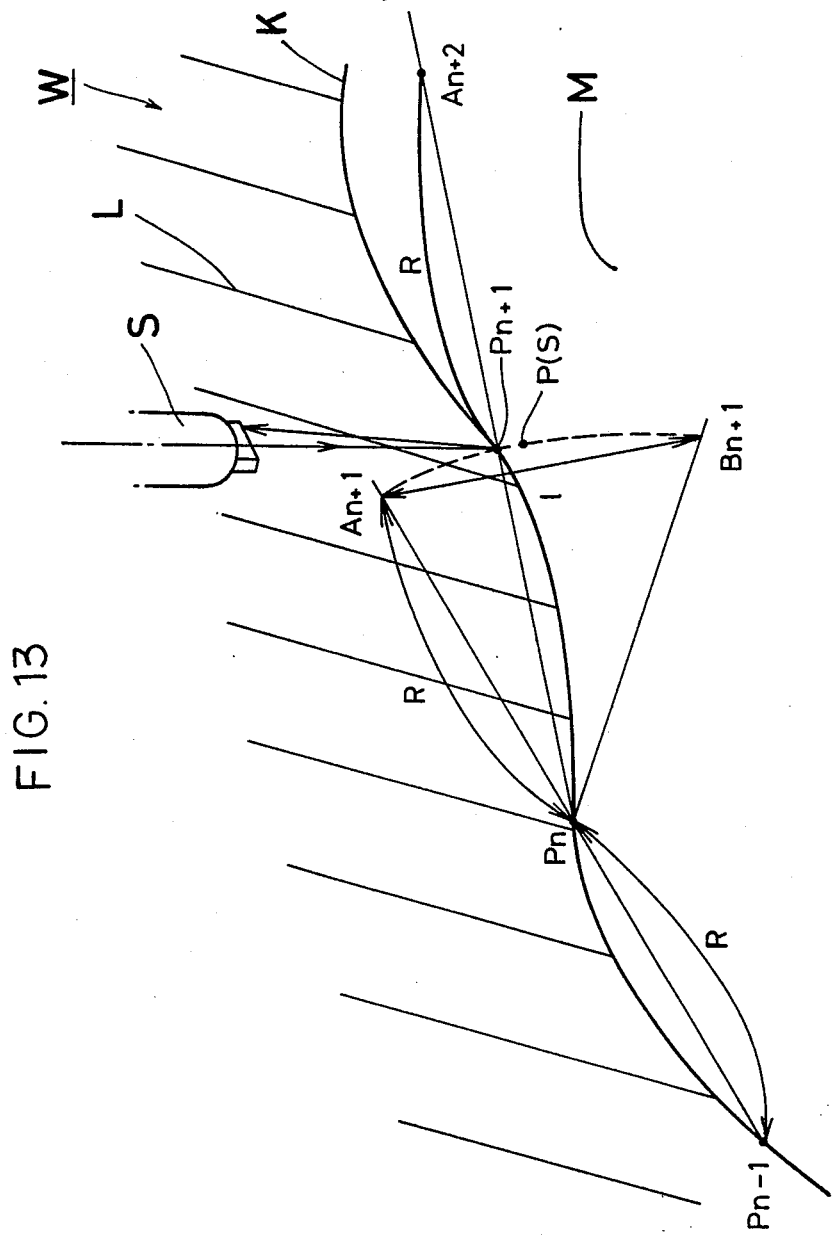
FIG. 13 is an explanatory chart explaining a modified embodiment of the present invention.
Figure 14:
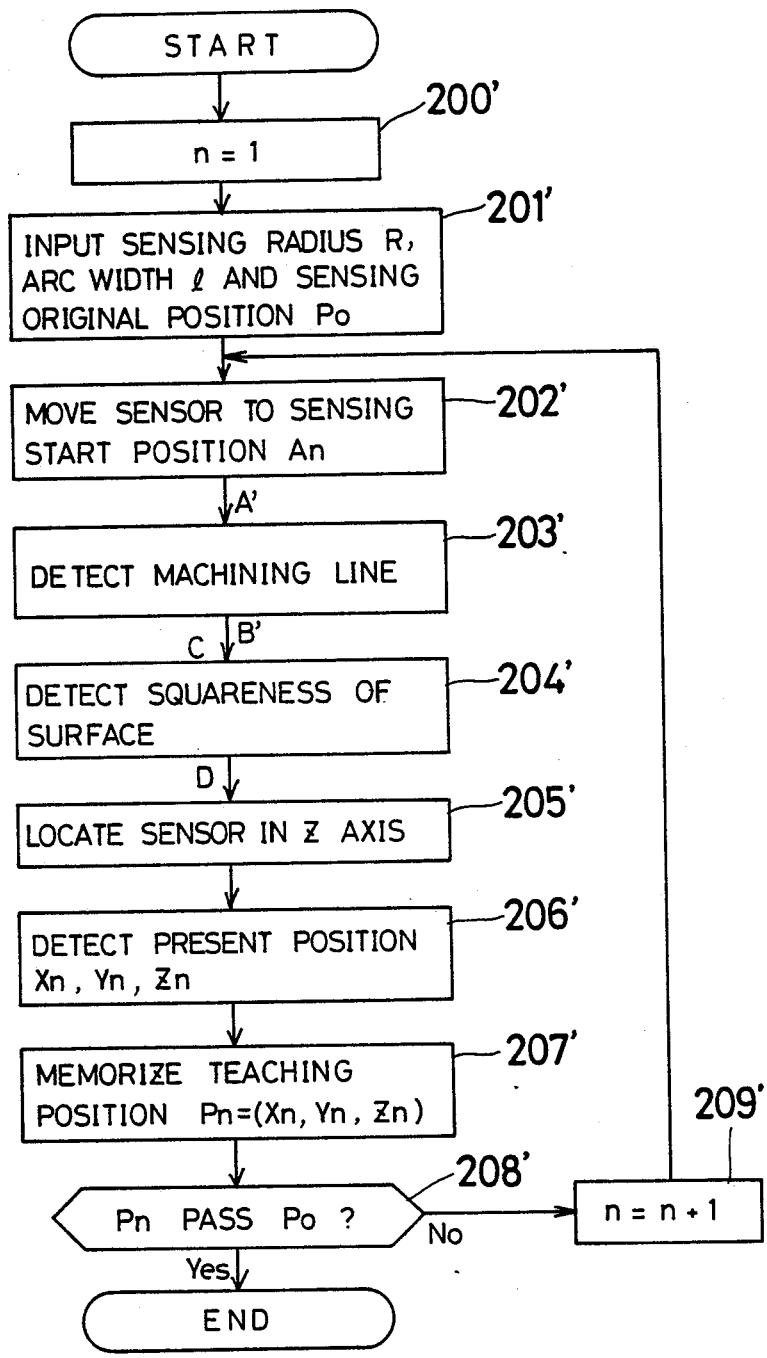
FIG. 14 is a flow chart explaining the operation of the CPU in the modified embodiment.
Figure 15:
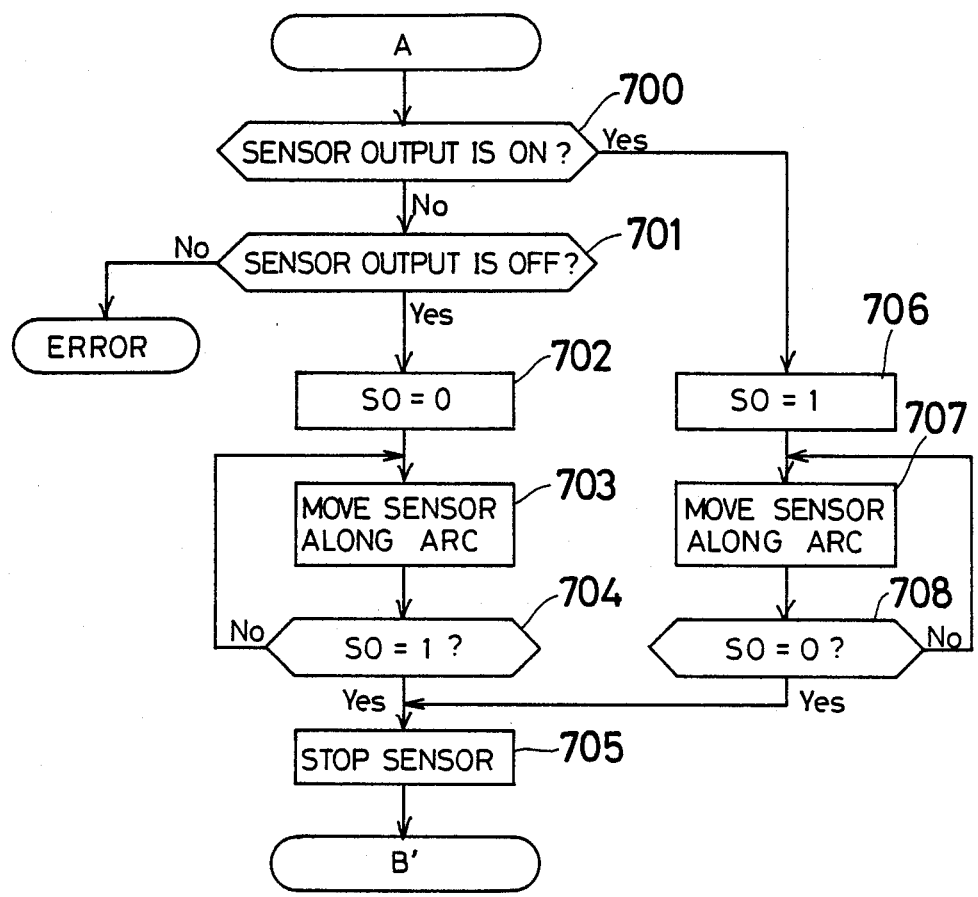
FIG. 15 is a detailed flow chart explaining the machining line detecting operation shown in FIG. 14.

The second embodiment of the invention will now be described. In the second embodiment, the sensing interval or radius is fixed as R as shown in FIG. 13. The CPU 20 executes the process as shown in FIG. 14 for sensing operation, and a sensing radius R is input as a sensing interval at step 201'. Data indicating an arc width l and sensing original position are also input at step 201'. Furthermore, the machining line detecting process at step 203' shown in FIG. 15 is different from the process used in the first embodiment. A detailed flow chart illustrating the process at step 203' is shown in FIG. 15. The rest of the process shown in FIG. 14 is the same as the process used in the first embodiment. In this embodiment, it is ascertained whether or not the output of the sensor S is ON, at a first step 700.

If the output is OFF, the process moves to step 701 in order to ascertain whether or not the output is OFF. If it is ascertained at the step 701 that the output is not OFF, occurrence of an error is displayed. If it is ascertained at the step 701 that the output is OFF, a sensor output flag SO is set to 0, and then, the sensor S is moved along an arc of radius R and width l at step 703. Thereafter, it is ascertained whether or not the sensor output flag is 1. If it is not 1, it indicates that the sensor S is still moving in the dark zone, and the process moves back to step 703 in order to continue movement of the sensor S. If the sensor flag SO is 1, it indicates that the output of the sensor S has changed from OFF to ON, i.e. such indicates that the borderline K is detected, and then, the movement of the sensor S is stopped at step 705. The process described above serves in the case that the sensor S is moved from the dark zone L to the bright zone M.

If it is ascertained at step 700 that the output of the sensor S is ON, the sensor output flag SO is set to 1 at step 706, and then, the sensor S is moved along an arc at step 707. In this case, the sensor S is moving from the bright zone M to the dark zone L. At step 708, it is ascertained that the sensor output flag SO is 0, and the movement of the sensor S is continued if the sensor output flag SO is not 0. If it is 0, it indicated that the sensor S has detected the borderline K, and the movement of the sensor S is stopped at step 705.

Figure 16:
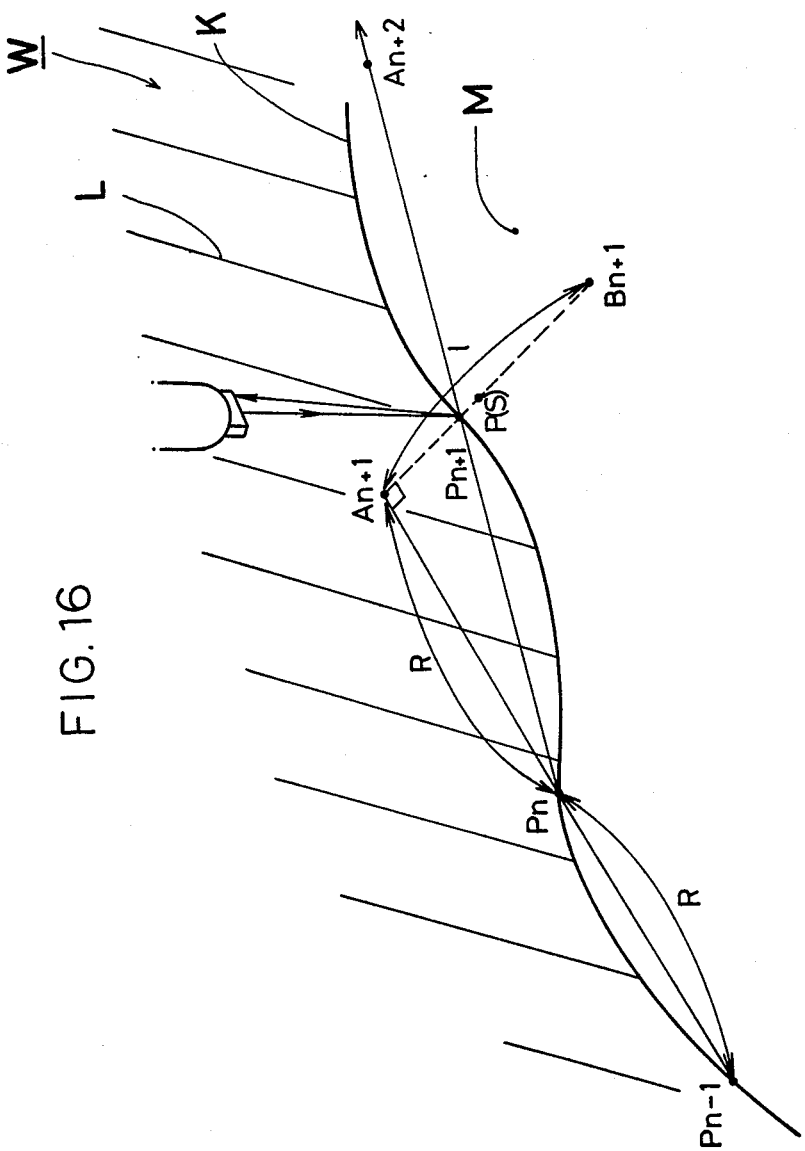
FIG. 16 is an explanatory chart explaining another embodiment of the present invention.

Furthermore, the sensor S can be moved along a straight line in the detecting operation of the borderline K as shown in FIG. 16. In this case, the sensor S is moved along the straight line which is perpendicular to the line connecting the teaching position Pn−1 and the sensing start position An.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method for teaching a machining line to be machined, which comprises the steps of:
    (a) forming a borderline along said machining line;
    (b) locating a borderline sensor for detecting said borderline at a teaching position on said borderline;
    (c) moving said borderline sensor to a sensing start position which is away from said teaching position and located in one side of said borderline;
    (d) moving said borderline sensor along a line across said borderline in order to detect said borderline;
    (e) memorizing a position of said borderline sensor into memory means as a next teaching position at the time when said borderline is detected; and
    (f) repeating said steps (c), (d) and (e).

2. A method for teaching a machining line as set forth in claim 1, which comprises moving said borderline sensor along an arc across said borderline in said step (d), wherein the center of said arc coincides with a previous teaching position.

3. A method for teaching a machining line as set forth in claim 1, which comprises moving said borderline sensor along a straight line across said borderline in said step (d), wherein said straight line is perpendicular to a line connecting the previous teaching position and said sensing start position.

4. A method for teaching a machining line as set forth in claim 1, which comprises changing the distance between said teaching position and said sensing start position according to the curvature of said borderline.

5. A method for teaching a machining line as set forth in claim 4, which comprises calculating said distance between said teaching position and said sensing start position as a function $F(\theta i, di)$, where $\theta i$ is the angle between the line connecting teaching positions $Pi-2$, $Pi-1$ and a line connecting teaching positions $Pi-1$, $Pi$, and $di$ is the distance between teaching positions $Pi-1$ and $Pi$, and said teaching positions $Pi-2$ and $Pi-1$ are successive teaching positions detected prior to the previous teaching position $Pi$.

6. A method for sensing a borderline formed on the workpiece, wherein said method comprises:
    (a) moving a borderline sensor across said borderline at each sensing position in order to detect the position of said borderline at each sensing position;
    (b) determining a first sensing interval between a previously sensing position and a next sensing position based upon the curvature of said borderline at the portion located before said previously detected position;
    (c) moving said borderline sensor to the sensing start position of the next sensing position by moving said borderline sensor along said first sensing interval;
    (d) moving said borderline sensor across said borderline in order to detect a next position of said borderline;
    (e) determining a second sensing interval based upon the curvature of said borderline at the portion located before said next position;
    (f) comparing said first sensing interval with said second sensing interval;
    (g) memorizing said next sensing position when said first sensing interval is smaller than said second sensing interval; and (h) moving said borderline sensor back to said previously detected position and repeating said steps (c) through (h) by using said second interval, when said second sensing interval is smaller than said first interval.

7. A method for sensing a borderline as set forth in claim 6, wherein said first sensing interval is calculated as a function $F(\theta i, di)$ at said step (b), where $\theta i$ is the angle between line connecting positions $Pi-2$, $Pi-1$, and a line connecting positions $Pi-1$, $Pi$, and $di$ is the distance between positions $Pi-1$ and $Pi$, said sensing positions $Pi-2$ and $Pi-1$ are successively sensed positions detected prior to the previously sensed position $Pi$; and said second interval is calculated as a function $F(\gamma i, di+1)$ at said step (e), where $\gamma i$ is the angle between the line connecting positions $Pi-1$, $Pi$ and the line connecting positions $Pi$, $Pi+1$, and $di+1$ is the distance between positions $Pi$ and $Pi+1$, wherein said position $Pi+1$ is a position detected next to said position $Pi$.

8. A method for sensing a borderline as set forth in claim 7, wherein said borderline sensor is moved along the line connecting said position $Pi-2$, $Pi-1$ from said position $Pi-1$ to a sensing start position, which is away from said position $Pi-1$ by said sensing interval $di$, at said step (c); and is moved along the arc of radius $di$, the center of which coincides with said position $Pi-1$, at said step (d).

9. A method for sensing a borderline as set forth claim 7, wherein said first sensing interval is set to a predetermined lower limit value when said first sensing interval calculated at step (b) is smaller than said lower limit.

* * * * *